Sept. 12, 1933.　　　E. M. MORROW　　　1,926,347
CONFECTION AND PROCESS OF MAKING SAME
Original Filed Sept. 19, 1927　　2 Sheets-Sheet 1

Witness:
William P. Kilroy

Inventor:
Eva M. Morrow
By Brown, Boettcher & Dienner
Attys

Sept. 12, 1933.    E. M. MORROW    1,926,347
CONFECTION AND PROCESS OF MAKING SAME
Original Filed Sept. 19, 1927    2 Sheets-Sheet 2
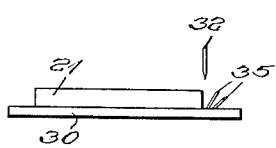
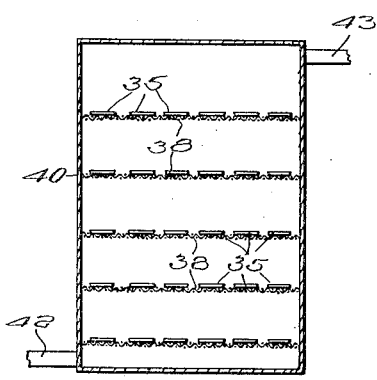
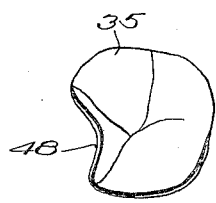
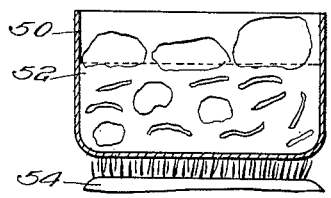
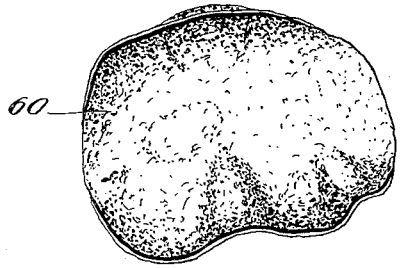
Witness:
William P. Kilroy
Inventor:
Eva M. Morrow
By Brown, Boettcher & Dienner
Attys Patented Sept. 12, 1933

1,926,347

UNITED STATES PATENT OFFICE 1,926,347

CONFECTION AND PROCESS OF MAKING SAME

Eva M. Morrow, Crystal Lake, Ill.

Application September 19, 1927, Serial No. 220,364
Renewed December 16, 1931

7 Claims. (Cl. 99—10)

This invention relates to confections and the like and it contemplates a generally improved confection of pleasing taste and attractive appearance and a process of making same.

According to the present invention I provide a chip-like confection which will explode or pop in hot grease. The ingredients are few and comparatively simple and by the process which I have provided and which I believe is broadly new, the confection is brought to the condition so that it will pop or explode in the hot grease.

The popping of the confection, which is adapted to make an attractive display, is, I believe, the result of the explosion or expansion of oxygen and such other gases and any vegetable oils confined in the chip-like articles when they are placed in the hot grease. The theory of the action may be the result of other or additional conditions than confining of these gases or oils in the chips by the process and the expansion or explosion of these gases when the chips are placed in hot grease. I shall, therefore, describe, in the following detailed specification, the article, the process and what I have found or believe occurs and shall reserve the right to correct or supplement the theory of the action, should this theory be found different or should there be additional theory than that above referred to.

The invention is illustrated in the accompanying drawings in which:

Fig. 6 shows diagrammatically the sixth step in the process;

Fig. 7 is a side elevational view of the chip-like confection before drying;

Fig. 8 shows diagrammatically the step of drying the chip-like confection;

Fig. 9 is a view similar to Fig. 7 of the confection after drying;

Fig. 10 shows diagrammatically the step of popping the confection in hot grease; and Fig. 11 is a view similar to Figs. 7 and 9 of the popped or exploded confection.

Figure 1:
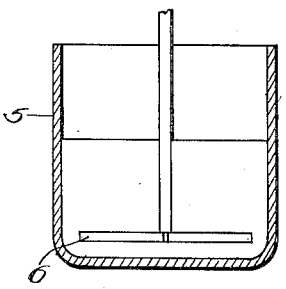
Fig. 1 shows diagrammatically the first step in the process.
Figure 2:
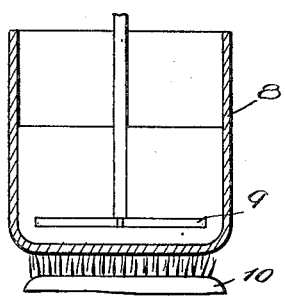
Fig. 2 shows diagrammatically the second step in the process.

The material of which the confection is formed comprises two batches of dough, one batch, designated for the purpose of clarity herein, as the first batch, comprising a mixture of tapioca flour, which has been processed to make it edible and now commonly referred to on the market as tapioca flour, with sugar, water, salt and suitable flavoring, as desired.

While the particular proportions may be varied, I find that one (1) pint of water for every pound of tapioca flour, sugar, salt and flavoring mixture, is suitable. Although, not limited thereto, in a particular embodiment of the invention the tapioca flour constitutes about eight (80%) percent of the tapioca flour, sugar, salt and flavoring mixture, the sugar being used in proportion to produce the desired sweetening and the salt and flavoring in quantities or proportions to secure the desired flavoring of the mixture.

The water employed may be cold or at least unheated and the ingredients are mixed in any suitable vessel 5 into a doughy mass or paste. For the purpose of mixing, the vessel 5 is shown as provided with a mixer or agitator 6, but it is to be understood that this is diagrammatic and illustrative and that the particular manner of mixing may be varied widely.

The second batch of dough or paste is substantially the same as the first batch, with the exception that corn starch is used in place of the tapioca flour, that is, the second batch comprises, in a particular embodiment of the invention, a mixture of one (1) pint of water for every pound of corn starch, sugar, salt and flavor mixture, the corn starch, as before, constituting about eighty (80%) percent of this mixture. As before the particular proportions may be varied to produce the desired dough or paste and such exact proportions as I have set up herein are for the purpose of teaching the process, under the law and I do not intend to be limited to particular proportions except as they may be included in the appended claims.

The second corn starch dough or batch is first cooked separately from the first batch of dough or paste. This is done preferably in the mixing thereof, the second batch being preferably mixed under a temperature in a suitable vessel 8 provided with a mixer or agitator 9, and heated by gas, oil, electricity or any other suitable burner or heater 10. This second batch is cooked at a temperature of about 160° F. or above. I find that where it is cooked at a temperature of from 160° to 175° F. highly satisfactory results are secured. Higher temperatures may be employed, where found desirable, or suitable, but I find, at present, that the temperature must be at least substantially 160° F. or above to bring the second batch of dough to the desired condition. In the particular embodiment of the invention described herein I find that a temperature of at least 160° F. is necessary to coagulate and cook the material to the desired thickened doughy or paste-like condition. This process brings the chips to the condition in which they will pop or explode in hot grease and I find that when this second batch is cooked thoroughly or the desired amount it will get translucent, this translucent appearance indicating that this second batch has been sufficiently cooked and that when the chips are completed as will be described they will pop or explode in the hot grease.

Figure 3:
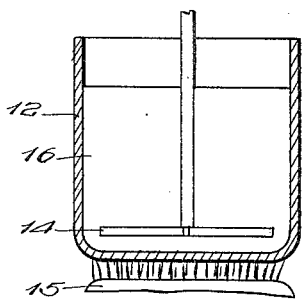
Fig. 3 shows diagrammatically the third step in the process.

By the next step in the process the first and second batches of dough or paste are mixed together or combined in the vessel 8, or in any other suitable vessel, such as indicated at 12 in Fig. 3 and they are mixed together or agitated as by means of a mixer or agitator 14 and under suitable temperature from a burner 15. Any suitable burner or heater may be employed and the first and second doughs, designated more or less diagrammatically at 16 are mixed and agitated together in the vessel 12 under a temperature, preferably from 125 to 175 degrees F., although any suitable temperature that will cook the dough or paste to the desired condition may be employed. By cooking the second batch first separately from the first batch it may be cooked at a higher temperature than the temperature under which the first and second batches are cooked together in the step of the process shown in Fig. 3. I find that it is desirable to cook the second batch at a temperature higher than the first batch can be cooked at, and then the two batches are cooked together in Fig. 3 preferably at a slightly lower temperature, as already referred to, to the desired pasty condition. In adding the first batch of material to the second batch the second batch loses its translucent appearance.

Figure 4:
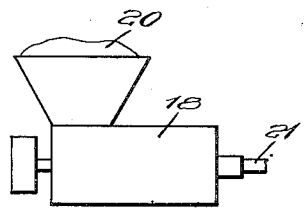
Fig. 4 shows diagrammatically the fourth step in the process.
Figure 5:
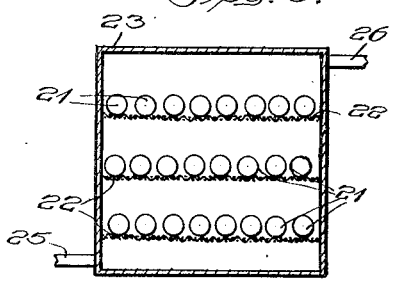
Fig. 5 shows diagrammatically the fifth step in the process.

The resulting flour and starch dough in its coagulated or pasty condition is then shaped in any desired manner. For the purpose of illustration, I have illustrated a sausage machine at 18 in Fig. 4 and the flour and starch dough indicated at 20 in the same figure may be run through this machine, as shown, and shaped into rolls 21. It is to be understood that any suitable or preferred shaping means may be employed. The dough may be die-shaped, molded, or otherwise suitably shaped.

By the next step in the process the rolls 21 of shaped dough are again cooked to bring the combined material to the condition in which the chips will pop or explode in hot grease. For this purpose I place the rolls 21, which may be cut in suitable lengths on trays 22 which are placed in a steam chest 23. The rolls 21 may be rolled in flour before placing them upon the trays 22 so that they will not stick thereto. The rolls 21 are cooked in the steam chest to the condition in which the final chips will pop or explode in hot grease, and I find that as the rolls 21 become sufficiently cooked they will take on a translucent appearance which I find effectively indicates when the rolls are sufficiently cooked and in condition for removal from the steam chest.

The steam chest 23 is indicated diagrammatically as provided with an inlet 25 and an outlet 26 and in the embodiment of the invention described the rolls 21 are cooked in this chest at a temperature of from 125 to 150 degrees F. for about one and one-half to two hours (1½ to 2 hrs.). The rolls 21 in the chest 23 are directly subject to the steam passing therethrough and I find that this cooking eliminates or materially reduces the water that is necessary. For example, it enables the use of one part water to one part flour dough and one part water to one part starch dough where as high or higher than nineteen parts water to one part flour mixture, as well as nineteen parts to one part starch mixture might otherwise be necessary.

Broadly, however, the process lies in the manner of bringing the dough to the desired condition and I do not, therefore, intend to be limited to the particular steps or details shown or described. For example, more water could be used and the dough cooked other than in a steam chest under the broad aspect of the present invention.

Still further the mixed flour and starch mixtures could be mixed cold instead of cooking one batch, as above explained, and boiling water could then be added in the desired proportion to bring the material to the desired doughy mass or paste.

The doughy mass or paste could then be put through a pressure gun, for example, having a hot outlet cylinder, such as a steam heated pipe at one end, the dough being forced out through this pipe and timed to be properly cooked as it comes out of the end of the pipe. That is, there could be enough hot water on cooking in the pipe so that when the dough came out it would be in the desired translucent condition or in condition so that the chips will pop or explode in hot grease.

It is still further contemplated that the heat for cooking the dough could be drawn through the dough by a vacuum, or any other steam, vacuum pressure or cooking arrangement, may be employed for converting the dough to the desired translucent mass.

By the next step in the process the shaped and cooked material is sliced as upon a board 30 and by means of a suitable knife 32, or by passing the shaped material or rolls through a suitable cutting machine or slicer to slice the same to chips 35, of the desired thickness, as shown in Fig. 7.

The chips 35 are sliced to a thickness of about $\frac{1}{32}$ of an inch. This is important because if the chips are too thick they will not pop or explode in the hot grease, and while I find that chips of a thickness of $\frac{1}{32}$ of an inch or less are preferable, the essence is that they be of a thickness that will pop or explode in the hot grease.

The sliced chips 35 are then dried. This may be done by placing them upon trays 38 in an oven 40 and blowing hot air over or through them. The hot air may be admitted at 42 and discharged at 43 and the oven may be additionally heated by a heater, although the hot air my be sufficient and the additional heat dispensed with. The chips may, of course, be dried in any suitable manner, the only requirement being that they be dried and that substantially all moisture be removed. The dried chips may curl slightly, as shown at 48 in Fig. 9. These dried chips are now in condition to be popped or exploded in hot grease. They may be sold and distributed in this condition and will keep indefinitely without spoiling or impairing their ability to pop or explode in hot grease.

The chips may be sold to the public in the condition shown in Fig. 9 and the confection is prepared or brought to condition to eat by dropping the chips 35 in hot grease. This step is shown in Fig. 10, in which the vessel 50 contains a body of grease 52 which may be lard, peanut oil, cotton seed oil, vegetable oil or any other desired or suitable grease which is brought to a temperature of 350 to 450° F. in the vessel 50 as by means of a suitable burner or heater 54. This temperature range has been found preferable, but any temperature that will pop or explode the chips when they are dropped therein may be employed.

Upon bringing the grease to the desired temperature the chips are dropped therein and immediately pop or explode and rise to the surface of the grease.

The popping or exploding greatly enlarges the size of the chips and converts same into irregular buoyant and fluffy appearing chip-like confections, somewhat resembling potato chips in shape. The popped or exploded confection is indicated at 60 in Fig. 11 and these exploded chips are of considerable bulk, light in weight and fluffy in appearance. Upon being popped or exploded the confection is ready to eat. It immediately rises to the top of the oil from where it may be removed and sold, as desired. The confection is porous, exceedingly light and of flaky appearance.

As already pointed out it seems that the process transforms the moisture into oxygen cells and that the oxygen and other gases and any vegetable oils confined in the chips are popped or exploded by the heat of the oil or grease in which they are dropped. The chips in the form shown in Fig. 9 have a glazed finish or coating which seems to confine the gases or any vegetable oils within the chips, so that they will be effectively exploded in the hot grease.

It is to be understood that the chips may be flavored and sweetened as desired and that suitable coloring may be added, where desired to give the exploded or puffed chips any desired color.

The confections may be made thin, without cutting, as by pouring the dough in thin layers, or molding or otherwise forming the thin confections.

I claim:—

1. The process of making a confection which comprises mixing a dough of tapioca flour, water and flavoring, mixing a dough of corn starch, water and flavoring separate from said first dough, cooking the corn starch dough first separately from the flour dough, then combining the doughs and mixing same and cooking the combined doughs at a temperature lower than the temperature at which the corn starch was cooked and to convert same into a generally translucent mass, forming the mass into relatively thin confections, and drying the confections.

2. The process of making a confection which comprises mixing a dough of tapioca flour, water and flavoring, mixing a dough of corn starch, water and flavoring separate from said first dough, cooking the corn starch dough first separately from the flour dough, then combining the doughs and mixing same and cooking the combined doughs at a temperature lower than the temperature at which the corn starch was cooked and to convert same into a generally translucent mass, forming the mass into relatively thin confections to glazed condition, drying the confections, and popping in hot grease.

3. The process of making food products which comprises preparing a dough of powdered tapioca, cornstarch, water and flavoring, cooking the dough into a cooked mass, slicing the cooked mass into thin food products, drying the sliced food products to a generally glazed, curled and relatively brittle condition, dropping the dried food products into and below the surface of a relatively deep body of grease, and exploding and expanding the food products to relatively great size in the body of hot grease and to a buoyant fluffy condition and until the expanded fluffy and buoyant food products will rise to and float on the surface of the body of hot grease.

4. The process of making food products which comprises preparing a dough of water and a powdered starchy material having the characteristics of exploding and expanding when submerged in oil at a temperature over 250° F. to relatively great size and reduced density, but remaining integral, cooking said dough into a cooked mass, dividing the said mass into thin pieces, drying said thin pieces to a relatively brittle condition, and submerging said pieces in a body of oily liquid of a temperature of over 250° F.

5. The process of making food products which comprises preparing a dough of water and a powdered starchy material having the characteristics of exploding and expanding when submerged in oil at a temperature over 250° F. to relatively great size and reduced density, but remaining integral, cooking said dough into a cooked mass, dividing the said mass into thin pieces, and drying said thin pieces to a relatively brittle condition.

6. A food product comprising a thin piece of cooked and dried dough of water and a powdered starchy material having the characteristics of exploding and expanding when submerged in oil at a temperature over 250° F. to relatively great size and reduced density, but remaining integral.

7. A food product comprising a dough of water and a powdered starchy material having the characteristics when divided into thin pieces and dried, of exploding and expanding when submerged in oil at a temperature over 250° F. to relatively great size and reduced density, but remaining integral.

EVA M. MORROW.

CERTIFICATE OF CORRECTION.

Patent No. 1,926,347.                                                            September 12, 1933.

EVA M. MORROW.

It is hereby certified that error appears in the printed specification of the above numbered patent requiring correction as follows: Page 1, line 66, for "eight" read "eighty"; page 3, line 82, claim 2, strike out the words "to glazed condition" and insert the same after the syllable "tions" in line 83; and that the said Letters Patent should be read with these corrections therein that the same may conform to the record of the case in the Patent Office.

Signed and sealed this 17th day of October, A. D. 1933.

F. M. Hopkins

Acting Commissioner of Patents.